United States Patent
Richardson et al.

(12)

(10) Patent No.: US 6,200,677 B1
(45) Date of Patent: Mar. 13, 2001

(54) PRESSURE SENSITIVE ADHESIVE TAPE

(75) Inventors: Peter James Richardson, Woodford; Peter William Salthouse, Knutsford; Joseph Preston, Crewe; Edward John Stewart, Manchester, all of (GB)

(73) Assignee: Scapa Group PLC, Blackburn (GB)

( * ) Notice: Subject to any disclaimer, the term of this patent is extended or adjusted under 35 U.S.C. 154(b) by 0 days.

(21) Appl. No.: 09/011,182

(22) PCT Filed: Jul. 29, 1996

(86) PCT No.: PCT/GB96/01822

§ 371 Date: Feb. 2, 1998

§ 102(e) Date: Feb. 2, 1998

(87) PCT Pub. No.: WO97/05206

PCT Pub. Date: Feb. 13, 1997

(30) Foreign Application Priority Data

Aug. 2, 1995 (GB) ................................ 9515827

(51) Int. Cl.[7] ............... C09J 7/02; C09J 123/02; C08L 23/02; B32B 7/12
(52) U.S. Cl. .............................................. 428/343
(58) Field of Search .............................. 428/343

(56) References Cited

U.S. PATENT DOCUMENTS

| 5,032,321 | * | 7/1991 | Breant . |
| 5,091,453 | * | 2/1992 | Davidson . |
| 5,159,006 | * | 10/1992 | Breant . |
| 5,166,250 | * | 11/1992 | Breant . |
| 5,284,889 | * | 2/1994 | Pyun . |

FOREIGN PATENT DOCUMENTS

| 836750 | | 4/1976 | (BE) . |
| 0 235 930 A3 | | 9/1987 | (EP) . |
| 0 255 866 A3 | | 2/1988 | (EP) . |
| 0326775 | * | 8/1989 | (EP) . |
| 2242450 | | 3/1975 | (FR) . |
| 2190384 | * | 11/1987 | (GB) . |
| 3-259938 | | 11/1991 | (JP) . |

* cited by examiner

*Primary Examiner*—Daniel Zirker
(74) *Attorney, Agent, or Firm*—Jacobson, Price, Holman & Stern, PLLC

(57) ABSTRACT

PURPOSE: To obtain a polyolefin resin composition excellent in heat and aging resistances and useful for films for self-adhesive tape substrates of good workability by mixing a base comprising a specified olefin resin with a high-mol. wt. hindered phenol antioxidant and a zinc compound.
CONSTITUTION: A resin composition prepared by mixing 100 pts. wt. resin base comprising at least one member selected from among a polyethylene, an ethylene/vinyl acetate copolymer, an ethylene/alkyl acrylate copolymer, an ethylene/alpha-olefin copolymer and a mixture thereof with 0.1–10 pts. wt. high-mol. wt hindered phenol antioxidant and 1–20 pts. wt. zinc compound. Examples of the zinc compound to be used are desirably inorganic compounds and include zinc borate and zinc oxide. As the high-mol. wt. hindered phenol antioxidant, one having a mol. wt. of 500 or above is particularly desirable from the viewpoint of non-blooming properties, etc.

8 Claims, No Drawings

PRESSURE SENSITIVE ADHESIVE TAPE

The present invention relates to a pressure sensitive adhesive tape.

It is conventional to bind wires and cables together using adhesive tape made from a polymeric material. The constituent polymers of such tapes are generally halogenated in order to provide the necessary flame retardance. For example, many tapes are made from polyvinyl chloride (PVC). The main problem of PVC and other halogenated polymers is that upon combustion a large volume of toxic, acidic and highly corrosive hydrogen halide smoke is liberated. In addition there has recently been much debate surrounding the environmental damage caused during the manufacture and disposal of PVC products. Hence there is a need for a halogen-free, recyclable adhesive tape. Ideally the adhesive tape should be suitable for a wide range of automotive and industrial applications and should exhibit sufficient flexibility, softness, flame retardancy and have acceptable unwind and handling properties. Most non-PVC adhesive tapes have no flame retardant properties. Those that do tend to be inflexible. The flexibility of the tape is now a crucial consideration as a common use for such tapes is to bind together the wires and cables of vehicle wiring harnesses. As these harnesses increase in complexity they include increasing numbers of wires which must be received through small holes in the vehicle body.

Thus the flexibility of the harness during installation and in service should not be unduly restricted by the adhesive tape. Such flexibility is frequently achieved by the use of plasticisers having a relatively low molecular weight with respect to that of the host polymer. Certain of these plasticisers have been shown to be carcinogenic. Furthermore, plasticisers in general present problems due to their tendency to migrate from the film into the adhesive, resulting in changes in adhesive performance.

The present invention seeks to provide a recyclable, flexible, pressure sensitive adhesive tape having no halogen component and not being prone to the problems caused by plasticiser migration, but which has acceptable flame retardant properties.

According to the present invention there is provided a pressure sensitive adhesive tape comprising a tape body coated on one side thereof with an adhesive, the tape body comprising the following components:
(a) from 40% to 85% wt. of at least one copolymer of olefin with vinyl- or acrylic esters (hereinafter called "copolymer a");
(b) from 0% to 20% wt. of low density (less than 0.9 g cm$^3$) polyethylene;
(c) from 20% to 55% wt. of inorganic filler and/or flame retardant consisting of any of the following either alone or in combination: aluminum trihydrate filler, zinc borate, an organic polyphosphate, polyammonium phosphate or magnesium hydroxide; and
(d) from 0% to 5% wt. of a silane coupling agent.

The tapes of the invention are sufficiently flexible and soft for most applications and have good unwinding and handling properties such that the tapes are suitable for both automatic and manual wrapping. Sufficient flame retardancy is also exhibited to satisfy the standard tests UL510 and ISO 3795, even though the tapes do not comprise any halogenated components.

The "copolymer a" component of the tape may comprise any of the following either alone or in combination: ethylene vinyl acetate copolymer (EVA), ethylene-methyl acetate (EMA) or ethylene-butyl acetate (EBA). The preferred component is EVA.

The "copolymer a" component of the tape renders the tape with its good flexibility. The "copolymer a" preferably has a low melt flow index (MFI), i.e. an MFI value of less than 6. This reduces the tendency for stress cracks to occur in the tape, especially at higher temperatures. The "copolymer a" preferably comprises at least two vinyl acetate copolymers having different melt flow indexes. In a particularly preferred embodiment of the invention the first of said copolymers has an MFI of between 4 and 7, and ideally 6, and the second has an MFI of from 0.5 to 1, and ideally 0.75, the two copolymers being present in a ratio having a range from 3 to 1.5:1 and ideally being 2:1 (first polymer:second polymer).

The low density polyethylene is more compatible with the filler than the "copolymer a" and ensures a more homogeneous distribution of the filler.

The fillers and/or flame retardants have a low surface area so as to enhance flexibility. Fillers having a BET value of substantially 4 are preferred.

The composition may further optionally comprise from 5% to 45% wt. of the plastomer polypropylene. Polypropylene is added in order to raise the temperature rating of the tape.

The film may be manufactured by any conventional technique, for example melt blowing. It is noted that PVC cannot be melt blown and therefore must be cast or calandered. Thus the tape of the invention is less expensive to manufacture.

The adhesive of the tape may comprise any standard adhesive for such tapes including, for example, solvent or water based or powder coated acrylic, polyurethane or polyester adhesives or natural rubber based adhesives. Heat curable adhesives are preferred.

The tapes are free of halogenated materials such as PVC. The tapes are also preferably free of plasticisers, which are prone to migration and have been shown to be carcinogenic.

The tapes are also resistant to conditions which are conventionally found in motor vehicle engines, such wires being subjected to high temperatures and contact with water and fluids such as petrol, diesel, oil, salt solution and anti freeze.

The tapes of the present invention have a temperature rating of between 105° and 130°.

In order that the present invention may be more readily understood specific embodiments thereof will now be described by way of example only with reference to the examples hereafter in which the amounts given are in php (parts per hundred parts of polymer).

Compound A 9.59 Evatane 28051 8.13 VLDPE$^2$, 82.28 Evatane 1005 VN4$^3$, 74.26 aluminum trihydrate (BET=4), 1.27 Irganox 1010$^4$, 0.71 AMEO-T$^5$, 0.60 stearic acid and 0.60 paraffin wax.

Compound B 6.2 Evatane 2805, 5.2 VLDPE, 88.60 Evatane 1005 VN4, 48.00 aluminum trihydate (BET=4), 1.25 Irganox 1010, 0.40 stearic acid, 0.40 paraffin wax, 0.50 AMEO-T and 3.75 black masterbatch pigment.

Compound C 5.2 Evatane 2805, 4.4 VLDPE, 90.4 Evatane 1005 VN4, 3.6 Irganox 1010, 0.2 AMEO-T, 60.00 aluminum trihydrate (BET=7), 0.32 stearic acid and 0.32 paraffin wax.

Compound D

45 Evatane 1005 VN4, 25 Lotryl 29 MA 03$^6$, 15 Lotader 3210$^7$, 15 VLDPE, 1.50 Irganox 1010, 1.50 stearic acid, 1.50 paraffin wax, 90 aluminiuum trihydrate (BET=7) and 2.0 black masterbatch. Tapes prepared from Compound D have a temperature rating of 125° C.

REFERENCES

1 Evatane 2805 Elf Atochem tradename for a copolymer of ethylene and vinyl acetate. Vinyl acetate content is 28% and its melt flow index is 5.0 g/10 minutes.
2 VLDPE Very low density (0.911g/cm$^3$) polyethylene with a melt flow index of 0.7 g/10 minutes.
3 Evatane 1005 VN4 Elf Atochem tradename for a copolymer of ethylene and vinyl acetate. Vinyl acetate content is 14% and its melt flow index is 0.7 g/10 minutes.
4 Irganox 1010 Ciba Geigy tradename for a standard antioxidant system.
5 AMEO-T Huls AG tradename for an octyl triethoxy silane coupling agent used to coat the flame retardant (aluminum trihydate) particles.
6 Lotryl 29 MA 03 Elf Atochem tradename for a copolymer of ethylene and methyl acrylate.
Methyl acrylate content is 29% and its melt flow index is 3.0 g/10 minutes.
7 Lotader 3210 Elf Atochem tradename for a terpolymer of ethylene, butyl acrylate and maleic anhydride. Butyl acrylate content is 9% and its melt flow index is 5.0 g/10 minutes.

A zero halogen content harness tape prepared by melt wing compound B above had the following properties:

0.12–0.15 mm thickness (test method AFERA 4006)

min. 20N/cm tensile strength (test method AFERA 4004)

min. 300% elongation at break (test method AFERA 4005)

min. 1.5N/cm adhesion strength to steel (test method AFERA 4001)

min. 1.0N/cm adhesion strength to itself (test method AFERA 4001) min 2.0N/cm unwind strength (test method AFERA 4013)

passes the UL510 test and conforms with ISO 3795 in respect of flammability temperature rating of 105° C. (3000 hours at 105° C).

This tape is soft and conformable, tough, easy to unwind, fire retardant, recyclable, suitable for both hand and machine applications and resistant to moisture, weather and many chemicals (including dilute acids and alkalis).

The AFERA, UL510 AND ISO 3795 test methods are well known in the automotive tape industries.

The flexibility of the tapes of the invention can be compared with that of a standard PVC tape by measuring the modulus at 35% elongation - a 25 mm wide strip of a typical tape in accordance with the invention gives a value of 7 MPa, whereas a PVC strip of the same dimensions has a value of 12.6 MPa. Thus it can be shown that the modulus of the tapes of the invention is nearly 50% that of PVC; i.e. it is much more flexible.

It is to be understood that the above described embodiments of the invention are by way of illustration only. Many modifications and variations are possible within the scope of the invention.

What is claimed is:

1. A halogen-free pressure sensitive adhesive tape, comprising a tape body coated on one side thereof with an adhesive, the tape body comprising:

(a) from 40% to 85% by weight of at least one copolymer, the copolymer being ethylene vinyl acetate copolymer (EVA), ethylene-methyl acetate copolymer (EMA), ethylene-butyl acetate copolymer (EBA) or a mixture thereof;

(b) low density polyethylene in an amount of up to 20% by weight, the polyethylene having a density of less than 0.9 g cm$^{-3}$;

(c) from 20% to 55% by weight of an inorganic filler and/or a flame retardant which is aluminum trihydrate filler, zinc borate, an organic polyphosphate, polyammonium phosphate, magnesium hydroxide or a mixture thereof; and (d) a silane coupling agent in an on f up 5% by weight.

2. The tape of claim 1, wherein the copolymer has a melt flow index value of less than 6.

3. The tape of claim 1, wherein the copolymer comprises at least two vinyl acetate copolymers having different melt flow indexes.

4. The tape of claim 3, wherein a first of the at least two vinyl acetate copolymers has a melt flow index of between 4 and 7 and a second of the at least two vinyl acetate copolymers has a melt flow index in the range from 0.5 to 1.

5. The tape of claim 3, wherein the at least two copolymers are present in a ratio having a range from 3 to 1.5:1.

6. The tape of claim 1, wherein the inorganic filler material has a BET value of substantially 4.

7. The tape of claim 1, wherein the tape has a temperature rating in the range from 105° C. to 130° C.

8. A pressure sensitive adhesive tape, comprising a tape body coated on one side thereof with an adhesive, the tape body comprising:

(a) from 43% to 58% by weight of at least one copolymer, the copolymer being any of ethylene vinyl acetate copolymer (EVA), ethylene-methyl acetate copolymer (EMA), ethylene-butyl acetate copolymer (EPA), or a mixture thereof;

(b) from 2.7% to 7.6% by weight of low density polyethylene, having a density of at most about 0.9 g cm$^{-3}$;

(c) from 31% to 46% by weight of an inorganic filler and/or a flame retardant, comprising any of aluminum trihydrate, zinc borate, an organic polyphosphate, polyammonium phosphate, magnesium hydroxide, or a mixture thereof; and (d) up to 5% by weight of a silane coupling agent.

* * * * *